Jan. 3, 1961  G. B. KARNOFSKY  2,967,148
SELECTIVE ADSORPTION PROCESS AND APPARATUS
Filed Dec. 2, 1955  2 Sheets-Sheet 1

INVENTOR.
GEORGE B. KARNOFSKY
BY
Christy, Parmelee & Strickland
attorneys.

Jan. 3, 1961  G. B. KARNOFSKY  2,967,148
SELECTIVE ADSORPTION PROCESS AND APPARATUS
Filed Dec. 2, 1955  2 Sheets-Sheet 2

INVENTOR.
*GEORGE B. KARNOFSKY*
BY

United States Patent Office 2,967,148
Patented Jan. 3, 1961

2,967,148

SELECTIVE ADSORPTION PROCESS AND APPARATUS

George B. Karnofsky, Fox Chapel Borough, Pa., assignor to Blaw-Knox Company, Pittsburgh, Pa., a corporation of Delaware Filed Dec. 2, 1955, Ser. No. 550,640

13 Claims. (Cl. 208—310)

This invention relates essentially to separation of a mixture into two fractions by selective adsorption, employing continuous, cyclic counter-current adsorption method and apparatus.

It is well known that particulate solids such as activated charcoal, clays, silica gels, synthetic resins, and the like, when brought into contact with certain liquid or solutions, will attach to themselves components of these liquids by a phenomenon known generally as adsorption. As used in this disclosure the term "adsorption" has a broad meaning which is exemplified by the affinity of hydrocarbons for silica gel or clay particles, the affinity of ions for ion exchange resins which are unsaturated with respect to these ions, and the rejection of ions by ion exchange resins which are saturated with respect to these ions.

It is also well known that such granular solids, termed "adsorbents," are selective in their affinity for or power to adsorb such components of solutions and that this preference is determined partly by the quantity of the different components available for adsorption. This is to say, if two materials, here arbitrarily designated A and B, are available to the adsorbent in equal amounts, A may be preferred and B rejected; but if B is very greatly in predominance, B may be favored in place of A. The total of A and B that will be adsorbed is roughly dependent on the total of their concentrations in the solution.

It is also well known that when a component of the solution has been adsorbed by the adsorbent, the adsorbed material may be removed from the adsorbent by another substance, which may be a solvent for the adsorbed material which has a greater or lesser affinity for the adsorbent than does the adsorbed material. Such a substance is referred to as a "desorbent" or "elutant," and I shall hereafter refer to it as an "elutant." The phenomena above discussed are applicable alike to processes in which the elutant is substantially foreign to the "feed" or original mixture of substances to be separated, and to processes in which the elutant is a substantial constituent of the feed as well as the separated end products. In so-called ion exclusion, ionic components of aqueous solutions are separable from non-ionics by virtue of their selective rejection by saturated ion exchange resins. In this case the resin rejects the ionic component and adsorbs the non-ionic component as an aqueous solution, following which the resin is eluted with pure water.

The present invention therefore is premised on the separation into two fractions by selective adsorption of constituents of a feed mixture in which the adsorbent has a stronger affinity for one of the constituents than for the other; the elutant is intermediately adsorbable or of the same order of adsorbability as the feed components; and the elutant is separable from the feed components by well-known means such as distillation, evaporation, or precipitation. The object of the present invention is to provide a method and apparatus which is continuous and cyclic in that separation is continuously effected and the elutant continuously reused or recycled.

There are various processes to which the present invention is applicable and useful. The improvements herein described and claimed concern the apparatus and method of utilizing the phenomena above explained, and are not primarily directed to the separation of specific materials.

According to my invention the adsorbent material in the nature of a particulate solid is continuously moved through a closed path of travel passing over and over again through the same cycle. Through this adsorbent a liquid stream is circulated in an opposite direction, different liquids being introduced into the current, and liquids being removed from the stream at certan points, the elutant entering at one place and the feed mix entering the liquid stream at a point removed therefrom. The two fractions of the feed mix are removed at separated stations located on opposite sides of that point in the cycle where the feed stock enters. In the preferred practice of my invention, provision is made for the recycling or refluxing of some of the separated concentrate of one or both of the constituents of the feed to secure more effective operation and more complete separation of the feed ingredients, as will hereinafter more fully appear.

My invention has therefore as its principal objects the continuous separation of the fractions of a feed mix, an adsorptive material and elutant by a counter-current flow of liquids and solids and the provision of a method of and apparatus for effecting such procedure.

My invention may be more fully understood by reference to the accompanying drawings, in which.

Figure 1:
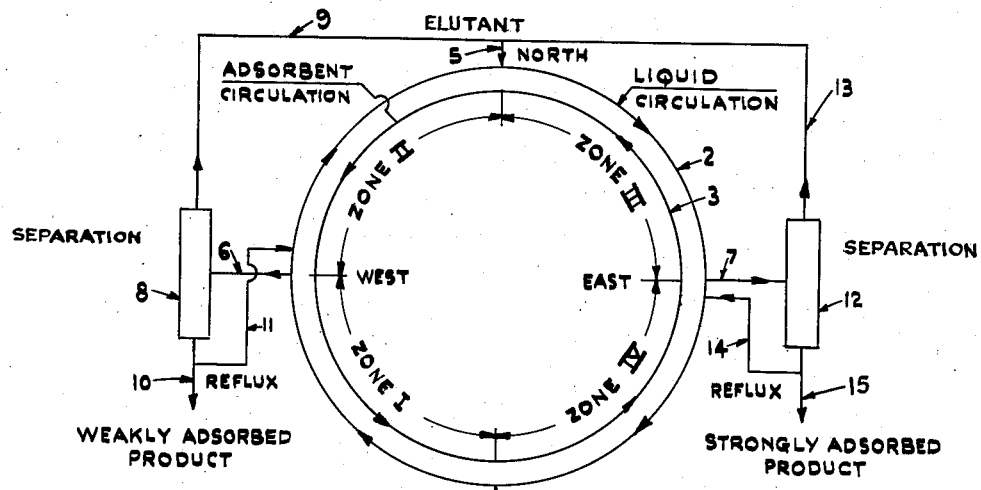
Fig. 1 is a schematic flow diagram illustrating my invention without detail as to the construction of a type of apparatus employed.

Referring first to Fig. 1, there is an outer circle 2 which represents the continuous path of flow for free liquids involved in the process, and the arrows indicate that the flow is in a clockwise direction. There is an inner circle 3 that indicates the closed cycle through which the solid, particulate adsorbent material travels, and the arrows indicate the direction of travel of the adsorbent, and such components as are adsorbed therein, which is opposite that of the free liquid, or counterclockwise. The apparatus is such that the free liquid floods through the oppositely traveling solid adsorbent containing adsorbed components, the free liquid and solid moving through essentially the same channel, but in opposite directions.

I have mentioned "free liquid" to distinguish from components which are adsorbed, the adsorbed components becoming physicaly associated with the particulate adsorptive, and their physical state, while so adsorbed, is speculative. Hereafter the term "liquid" as used herein means the free flowable liquid, as distinguished from adsorbed components which are moving with and as part of the adsorptive mass of the system.

The line 4 at the bottom of the diagram, which by analogy to the chart of compass is designated the "south" position, indicates the point where the feed mix of the two fractions to be separated is introduced into the closed counter-current flow system.

The line 5 at the top or "north" position is the place where the desorbent or elutant enters the cycle. At the intermediate "west" position there is a line 6 for the removal of some or all of the more weakly adsorbed component in the feed mix, and at the opposite side of the diagram at the "east" position is a line 7 for the removal of some or all of the more strongly adsorbed component. The liquid withdrawn at 6 enters a separator 8, such as an evaporator or distillation column, where the elutant that may be present is recovered and returned through pipe 9 to the desorbent inlet 5. The more weakly adsorbed fraction of the feed mix is withdrawn from the evaporator or separator 8 through pipe 10, and part of the concentrated fraction so removed may be returned or refluxed to the closed cycle system through pipe 11, entering the system adjacent to but separated from (in a clockwise direction), the offtake pipe 6.

Similarly, the pipe 7 for the strongly adsorbed constituent of the feed mix may enter a separator 12, such as an evaporator or distillation column, where the elutant which is separated out is recycled through pipe 13 to the desorbent inlet 5, and the concentrated strongly adsorbed constituent of the feed mix is discharged through pipe 15. However, some of the concentrate may be refluxed through pipe 14 to the closed cycle system, being introduced at a point adjacent to but separated from (in a clockwise sense) the offtake 7.

The system may thus be regarded as having in the usual case four zones, zone I from south to west; zone II from west to north; zone III from north to east, and zone IV from east to south. While the diagram shows a truly circular path, this is for illustration of a closed cycle system which in actual physical form might involve vertical towers, horizontal conveyors, and various types of apparatus not physically suggesting an actual circle, but which would provide a closed counter-current circuit with four zones as indicated. In a special case, the flow of liquid through zone IV may be zero, but in any case adsorbent circulation is continuous in a closed path.

Attention may be given to the specific operation of the system, and it may be pointed out that each zone has a distinct function. It may be assumed that the feed comprises a liquid carrying two fractions, designated A and B. The solid adsorbent material has a strong affinity for fraction A, which is referred to as the strongly adsorbed product. Constituent B is only weakly attracted or less readily adsorbed. The elutant is so chosen that its affinity for the adsorbent is not strongly different from that of either of the constituents to be separated, and preferably is intermediate between them in its affinity.

The function of each zone is different, but in each there is an exchange of adsorbable material between liquid and adsorbent by which it may be characterized. Thus the major adsorbed component in the adsorbent entering zone I from zone II is B, but in the counter-current exchange with liquid that takes place in that zone, B in the adsorbent is partially displaced by A; in zone II adsorbed elutant is displaced by B; in zone III adsorbed A is displaced by elutant; and in zone IV adsorbed B is substantially completely displaced by A to advance the displacement begun in zone I.

This may be explained in greater detail. The feed mixture entering at the south position joins the circulating liquid, if any, at that point, which is pumped or flows toward the west counter-current to the direction in which adsorbent and adsorbed components are moving. The adsorbent in zone I adsorbs and takes with it the more readily adsorbed component carrying it into zone IV, while simultaneously the weakly adsorbed components with which the adsorbent at west is saturated are released from the adsorbent. However, the removal of B components from the adsorbent is not completed in zone I since the adsorbent leaving that zone is in contact with the feed and necessarily retains B components. It is in zone IV, where it is in counter-current contact with liquid from the east substantially free of B, that the adsorbent is substantially or entirely freed of B. In zone I the circulating liquid may be substantially freed of A components since adsorbent entering zone I from zone II has been conditioned to take up the A components and yield some of the previously adsorbed B components to the liquid stream.

All or part of the circulating liquid is withdrawn at the west through pipe 6 and freed of elutant in separator 8. If all is withdrawn, some of the B product will be returned through line 11, but if only part is withdrawn B product may or may not be refluxed. In zone II liquid rich in B components flows counter-currently to regenerated adsorbent from the north which is saturated with elutant, and there is an exchange of B and elutant between adsorbent and liquid. Thus it is the function of zone II to drive the elutant out of the adsorbent before the latter reaches zone I and therefore keep substantially all or most of the elutant out of the liquid leaving at line 6, thereby reducing the amount of separation required in separator 8. Refluxing of B product through line 11 increases the ratio of B to elutant in the liquid entering zone II, thus enhancing the potential exchange of B and elutant in that zone.

Elutant enters the circulating liquid through line 5 and the combined flow moves through zone III in counter-current contact with adsorbent saturated with A. In the exchange that takes place elutant is adsorbed and so carried back to the north by adsorbent and displaced A with unadsorbed elutant is returned to the east as free liquid to be withdrawn through line 7. Part or all of the stream 2 may be withdrawn at 7 and reflux may or may not be returned through line 14. It is not required by this invention that zone IV be always present. In zone IV adsorbent containing both A and B moves counter-current to liquid from the east which is substantially free of B, thus causing B to be desorbed. Zone IV need not be used if it is permissible to have some B in the A product.

Since in zone III elutant desorbs A and in zone II B desorbs elutant, the elutant should have an affinity for the adsorbent near those of A and B and preferably intermediate between them. Such affinity can be expressed quantitatively by means of an "adsorption isotherm" well known to the art, which expresses the relationship between composition of a solution and the amount adsorbed from it on a known quantity of adsorbent. This is also conveniently expressed by an "adsorption index" which is treated at length in Hirschler Patent No. 2,441,572, granted May 18, 1948. As used by me in this specification, the adsorption index of a substance is the amount of that substance adsorbed by a standard amount of adsorbent at equilibrium from its dilute solution in a weakly adsorbed standard liquid at some standard concentration. When the elutant has an adsorption index intermediate those of the products A and B or relatively close to the adsorption index of one of the products, application of elutant above equilibrium effectively desorbs the product A in zone III, while similar application of product B effectively desorbs elutant in zone II.

Figure 2:
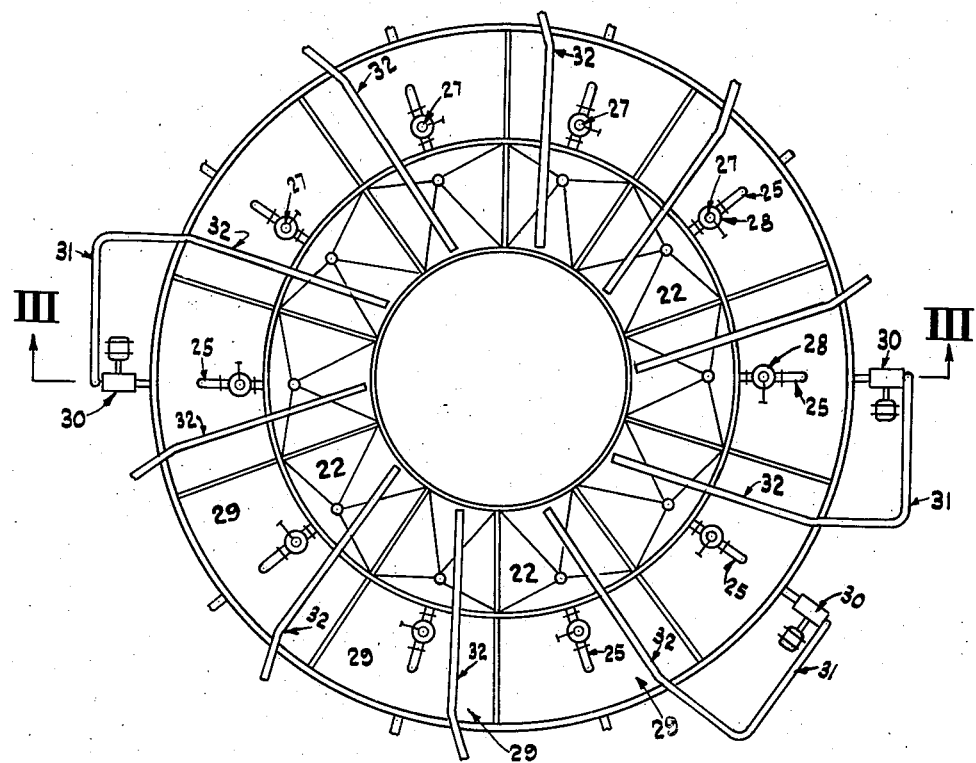
Fig. 2 is a schematic top plan view of one form of apparatus for the practice of my invention.
Figure 3:
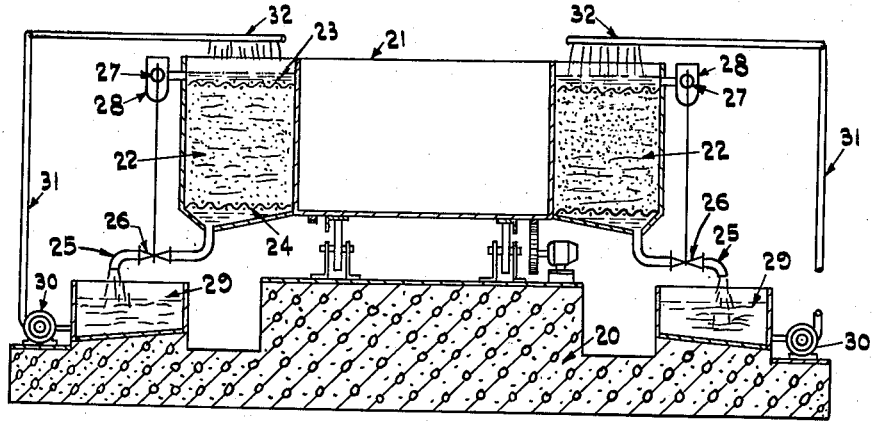
Fig. 3 is a vertical section in the plane of line III—III of Fig. 2.
Figure 4:
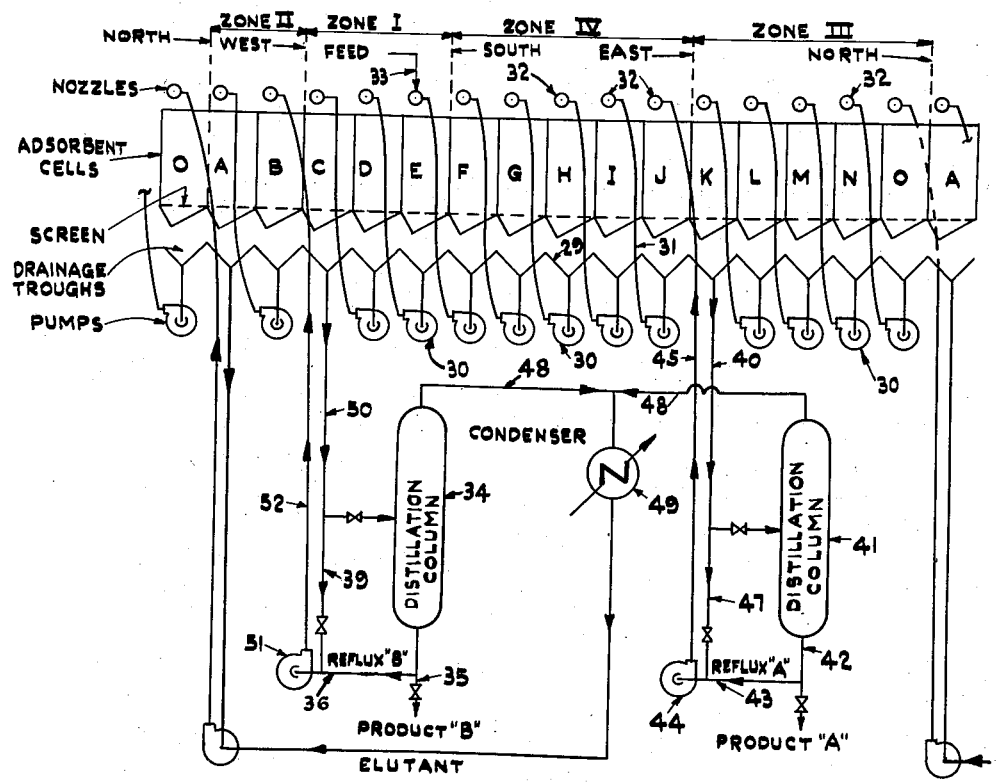
Fig. 4 is a "developed" schematic view of the apparatus shown in Figs. 2 and 3, showing the succession of individual cells constituting this apparatus, but showing it as though it were opened out into a flat plane instead of being circular.

Having explained the cycle of operation, the invention may be further understood by reference to an apparatus for effecting it as shown in a schematic manner in Figs. 2, 3 and 4. This particular apparatus is shown, not only because it is a most effective piece of equipment for the purpose, but also because it conforms to the circular diagram of Fig. 1.

In this apparatus there is a support 20 on which is carried a rotary frame or turntable 21. Around the periphery of the turntable is a continuous series of vats or cells 22, each having an open top and an inclined bottom. For clarity of illustration I have here shown fewer cells than would preferably be used, Fig. 4 being more nearly comparable to the actual number of cells. There is a top screen 23 to retain the body of adsorbent in the vat, and a screen 24 elevated above the bottom through which liquid may drain. There is a drain pipe 25 projecting radially from the bottom of each vat with a float controlled valve 26 therein controlled by a float 27 in a small float chamber 28 connected to each vat near the top. With this arrangement the adsorbent material in each vat or cell may be kept full of liquid and the rate of removal regulated to the input.

On the base under the path of travel of the discharge pipes 25 is an annular series of fixed catch basins 29, or receptacles into which liquid discharging from the pipes 25 is collected. Each catch basin or receptacle has an outlet pipe 30 leading to a motor-driven pump 30, and the discharge pipe 31 of each pump leads to discharge spray pipe 32. The pipes 32 extend radially over the vats on the turntable, and the number of basins corresponds to the number of vats. Consequently the number of basins actually shown in Fig. 2 is less than the number preferably employed. The spray pipes 32 are so positioned that at any instant of time the material collected in any basin is discharged into the next approaching vat. That is, if the turntable moves anti-clockwise, the liquid from any one receptacle 29 does not return the fluid to the vat immediately above it, but to the next approaching one. This is clear from Fig. 4 where for example the pump under H is discharging above G, and the one receiving liquid from G is discharging over F, etc. Since the turntable is rotating and the catch basins are fixed, the relation above described always maintains, but the specific relation of any one vat to any one catch basin is always shifting.

From this it will be seen that as the turntable with its series of vats turns counter-clockwise the free liquid that percolates through the vats is progressively pumped in a clockwise direction from one cell to the next. Each cell on the turntable is kept flooded with liquid, the respective float valves keeping a constant level in each cell.

Referring to the developed diagram in Fig. 4, it will be seen that there is a feed pipe 33 leading into the spray nozzle over the cell in position E, and as each cell in turn moves under this discharge 33, it receives feed liquor to be processed. Leading from the catch basin under the cell in position C is a pipe 50 through which liquid draining into that basin is carried down into a distillation column or other separator 34. As explained in connection with Fig. 1, this is the west position where the liquid rich in product B is removed and concentrated. The main body of the product B is led away through pipe 35, but part of it is refluxed through pipe 36, pump 37, and pipe 38 to the spray head 32 over the cell in position B in zone II. Valve controlled pipe 39 allows part of the liquid to be selectively or controllably bypassed around the distillation column. It will be seen that at this station the system described replaces the pump 30 and pipe 31 which is provided between most cells, but maintains the same forced transfer of liquid from one cell to the next counter-current to the travel of the particulate adsorbent material.

There is a similar system shown in Fig. 4 between the catch basin under the cell in position K in zone III and the vat or cell in positon J in zone IV, this system including pipe 40, distillation column or separator 41, offtake pipe 42 for the A component of the mix, reflux pipe 43, pump 44, and pipe 45. There is a by-pass pipe 47 through which liquid may be selectively and controllably by-passed by the distillation column. This system corresponds to the east location in Fig. 1, including the distillation column or other separator there designated 12.

The distillation columns 34 and 41 have vapor outlet pipes 48 leading to a condenser 49, and the condensed elutant together with liquid withdrawn through pipe 50 from the catch basin under the cell in position A in Fig. 4 is moved by a pump 51 and pipe 52 to the spray head of the cell O, corresponding to the north position of Fig. 1.

This completes the closed counter-current cycle, the free liquid moving always to the left as viewed in Fig. 4 (although actually it is traveling about a circular cycle), and the adsorbent in the cells moving always to the right, and the several zones as described with reference to Fig. 1 are provided.

While the liquid flow is always in the same direction and each cell is kept full, the rate of liquid flow from cell to cell is not necessarily uniform and may vary greatly, and the number of cells in each zone may vary, as shown in Fig. 4. It is also obvious that the composition of the liquid is not constant. Variations in the rate of flow from cell to cell in any zone is ordinarily of minor importance, but there is a marked variation of flow between zones. In zones II and IV for example, where some only of the refined or separated concentrate is being refluxed, the volume of liquid will be much less than in zones I and III. Because of the provision of float valves for each cell, the cells are kept full notwithstanding the variations in volume from zone to zone.

One particular example of the operation of my process may be described by way of illustration and not limitation. For example, in the separation of a naphtha mixture into its saturated and aromatic components, using adsorption and desorption, clay may be used as the adsorptive material and benzene as a solvent elutant. The aromatics are strongly adsorbed by the clay, the saturates are weakly adsorbed, and benzene is adsorbed in an intermediate range between the two. Adsorption indexes for various materials are available. (See for example Olsen Patent No. 2,564,717 setting forth adsorption indexes of various liquids for silica gel as the adsorbent.) While I might substitute silica gel in the present example, I prefer clay since, unlike silica gel, it is not "poisoned" by the olefins present in naphtha mixtures, a phenomenon well known and forming no part of my invention.

Referring to the diagram in Fig. 1, the naphtha mixture entering at south passes through zone I in which the aromatics are preferentially adsorbed, having the greater affinity for the clay. The liquid removed at west consists therefore essentially of saturated hydrocarbons (B product) plus some benzene (elutant). The benzene is distilled off at west and concentrated hydrocarbon saturates are drawn off, a portion, however, being refluxed into zone II where it is adsorbed by the clay with the simultaneous desorption of benzene. Benzene thus liberated is pumped in the counter-current manner described to the north position of zone III, where the stream of elutant recycled from the separation systems enters the liquid stream. It will be recognized that in all zones there is an exchange of material entering and leaving the adsorbent, with the total adsorbed remaining relatively constant.

The adsorbent clay moving past the south point contains both aromatics and saturates approximately in equilibrium with the feed. In zone IV the adsorbent is contacted counter-currently with concentrated aromatics refluxed in the cycling liquid. The concentrated aromatics so refluxed desorb or free the saturates from the clay entering zone IV, and by the time the adsorbent has reached the east position it will be free or substantially free of saturates and loaded with aromatics. The desorbed saturates from zone IV are pumped toward the south position to join the fresh feed and eventually be removed at the west. As the clay moves from zone IV to zone III it is contacted with benzene from the north moving counter-current to the clay, causing the aromatics to be desorbed, and leaves at the east as a relatively concentrated solution of aromatics and benzene. This solution is distilled to recover benzene and the aromatics product, part of which is returned to zone IV as reflux.

Prior to this invention, cyclic adsorption systems have been described including zones I, III, and IV, but the use and importance of zone II has not hitherto been recognized. Systems such as that described in Fig. 1 may include only zones I and III, in which case only the B product can be free of A but the A product can not be free of B. A cycle including zones I, III, and IV can make a B product which is substantially free of A and an A product which is substantially free of B, and such systems have been described especially in application to separation of aromatics from saturated hydrocarbons. The function of zone II, which has hitherto not been recognized, is that it provides the means by which the B product can be substantially freed of elutant within the adsorption apparatus without recourse to an uneconomical amount of subsequent separation of elutant from B product. In other words, by the use of a zone II as disclosed here, substantially less elutant is withdrawn with the B product and hence the separating apparatus at the west position need be designed to separate substantially smaller volumes of liquids. The separation thus possible is enhanced by the reflux of separated B product, and this too is an important part of my invention.

If the object of the treatment is to secure saturated hydrocarbons of high purity, zone IV with the recycling or refluxing of the aromatics may be omitted and separation effected with only zones I, II and III, which is a novel phase of my invention. Zone II is important, not because the adsorption of the B component is per se primarily useful, but the simultaneous desorption of elutant with the adsorption of the weakly adsorbed component means that substantially less elutant must be distilled off at the west position. It is therefore important in the economy of the process. A I—II—III zone process is useful where only the B product of the feed need be pure or reasonably so, but economy of operation as compared with a I—III system is desired. The I—II—III—IV zone process gives selective high purity to both end products with a maximum of economy. Thus, under any condition, I would carry some of the B product into the No. II zone preferably by refluxing of the B concentrate to desorb elutant, i.e., a zone II process in combination with III or with III and IV, and I consider this use or reflux of the concentrate of the B component to be an important step of my invention. Another important step is the use of an elutant having an adsorbability in the system intermediate that of the A and B constituents of the mix.

I have shown and described a rotary contact apparatus, but various forms of counter-current liquid-solid contact apparatus now available may be used, and will be well understood by those skilled in the art and physically such apparatus may bear little resemblance to the apparatus herein specifically described, but functionally provide the same succession of zones and processes, and its use is comprehended by my invention.

I claim:

1. The method of separating a liquid feed mix into two fractions by selective adsorption which comprises moving a mass of adsorbent continuously through a closed cycle, maintaining a counter-current flow of liquid through the adsorbent, said liquid flow being established in part by circulating the feed mix counter to the travel of the adsorptive material through a portion of the travel of such adsorbent, and adsorbing from the feed mix its more readily adsorbed fraction, withdrawing the unadsorbed part of the feed mix comprising the less readily adsorbed fraction, the liquid flow being further established in part by flowing an elutant through a succeeding portion of travel of the adsorbent to desorb the more readily adsorbed fraction of the feed mix and removing such desorbed fraction at a point in the travel of the adsorbent past the introduction of the feed mix and before the point of introduction of the elutant, the liquid flow being also established in part by refluxing some of the less readily adsorbed fraction of the feed mix from adjacent its point of withdrawal toward the point of introducing the elutant, whereby the counter-current flow of liquid is first comprised of feed mix from which the more readily adsorbed fraction is being adsorbed and carried away by the adsorbent and then constituted in part of the less readily adsorbed fraction and elutant with the less readily adsorbed fraction being adsorbed from the liquid stream and the elutant desorbed, the elutant flowing back toward the point of its introduction, and thereafter the stream is constituted of elutant and the more readily adsorbed fraction with the elutant being adsorbed and said fraction being desorbed and carried in said stream toward its point of removal.

2. The method defined in claim 1 wherein there is another part of the counter-current liquid stream formed by flowing some of the more readily adsorbed fraction through the adsorbent and circulating it from adjacent the point of its removal from the stream toward the point where the feed mix is introduced.

3. The method of selectively separating a more readily adsorbed component of a liquid mix from a less readily adsorbed one by a particulate adsorbent which comprises moving the adsorbent continuously through a closed cycle divided into four zones, moving the feed liquid counter-current to the adsorbent in the first zone and adsorbing the more readily adsorbed component, withdrawing at least some of the feed liquid from which the more readily adsorbed material has been adsorbed between the first and second zones, refluxing some of the less readily adsorbed component into the adsorbent in the second zone and flowing such reflux counter-current to the travel of the adsorbent in the second zone, introducing an elutant into the adsorbent material intermediate the second and third zones and moving it counter-current to the adsorbent toward the beginning of the fourth zone, and removing at least some of the more readily adsorbed fraction which has been desorbed by the elutant at a point between the third and fourth zones, and flowing some of the more readily adsorbed component into the fourth zone toward the feed.

4. The method defined in claim 3 which comprises refluxing the more readily adsorbed component into the adsorbent at the beginning of the fourth zone and moving it counter-current to the adsorbent and utilizing it to desorb the less readily adsorbed component, moving such less readily adsorbed component so desorbed counter-current to the adsorbent to the first zone where it is commingled with the feed, the elutant which is adsorbed in the third zone being displaced in the second zone and moved counter-current to the adsorbent to commingle with the elutant entering the cycle at intermediate the second and third zones.

5. The method defined in claim 7 wherein elutant which may be carried off with the more readily and less readily adsorbed components is separated from those respective components and returned to the adsorbent at the place in the cycle where the elutant is introduced into the adsorbent.

6. In the process of separating two components of a liquid mixture by selective adsorption wherein one component is more readily adsorbed than the other, the steps which comprise moving a solid adsorbent continuously through a closed cycle, introducing a feed mix into the adsorbent at one point in its cycle and moving it counter-current to the adsorbent through a portion of the travel of the adsorbent to adsorb the more readily adsorbable component of the mix, removing the portion of the feed mix from which the more adsorable component has been adsorbed at a point in the cycle of travel of the adsorbent removed from and ahead of the point where the feed is introduced, and introducing an elutant into the adsorbent at a point removed from and ahead of the point where the less readily adsorbed component is removed, moving the elutant counter-current to the adsorbent and by such elutant replacing in the adsorbent the more readily adsorbed component of the feed and at the same time saturating the adsorbent with adsorbed elutant, removing the more readily adsorbable component at a point intermediate the point of introduction of the elutant and the point where the feed is introduced, the adsorbent saturated with elutant moving in its closed cycle from the point where the elutant is introduced to the place of the removal of the less readily adsorbable component of the mix, and contacting the adsorbent in this last-mentioned portion of its travel with the less readily adsorbed component of the feed whereby the elutant is desorbed and the adsorbent becomes saturated with the less readily adsorbed material before it is again brought into contact with the feed mix.

7. The method defined in claim 6 which includes the step of moving the desorbed elutant in said last-mentioned part of its travel counter-current through the adsorbent material toward the point of introduction of the elutant.

8. In the process of separating two adsorbable components of a liquid mixture having different adsorption indexes by selective adsorption, the steps which comprise continuously advancing a body of adsorbent material in one direction past a liquid feed mixture inlet where the mixture is brought into contact with the adsorbent, advancing the mix through the adsorbent in a direction counter to the direction in which the adsorbent moves, whereby the more readily adsorbed component of the mixture is adsorbed and carried with the adsorbent back past the feed mix inlet and the less readily adsorbable component of the mix is advanced to a point of withdrawal, withdrawing the less readily adsorbed component at a point of withdrawal which is removed from the point of feed, introducing an elutant having an adsorption index intermediate the adsorption indexes of the components of the liquid mixture into the adsorbent at a point separated from the location where the feed mix is introduced and from the point where the less readily adsorbable material is withdrawn, and advancing the elutant through the adsorbent in a direction opposed to the direction of movement of the adsorbent to desorb and remove the more readily adsorbable component, removing the said desorbed component at a point intermediate the place where the feed mix is introduced into the adsorbent and the elutant is introduced, whereby the more readily adsorbable component is removed from the adsorbent before the adsorbent has passed the point where the elutant enters it, and contacting the adsorbent with an excess of the less readily adsorbed component in that portion of the travel of the adsorbent between the point where the elutant is introduced and the less readily adsorbable material is removed whereby the adsorbent will be substantially saturated with less readily adsorbable material before it reaches a repetition of its travel where it is again moved counter-current to the feed mix and elutant carried by the adsorbent into this region is desorbed.

9. Contacting apparatus for effecting the separation of differently adsorbable components of a liquid feed mix comprising means for moving a granular solid adsorbent continuously through a closed cycle, a succession of pumps with fluid circuits around the course of travel of the adsorbent for flooding liquid into the adsorbent at various points in its cycle and withdrawing it at immediately preceding points to maintain a counter-current flow of liquid through the adsorbent, means for applying feed liquid into the adsorbent at one point in its travel, means for introducing an elutant into the adsorbent at a point in the cycle remote from the feed, means intermediate the feed and the elutant introducing means and displaced from the elutant introducing means in the direction of flow of the adsorbent for removing liquid carrying the less readily adsorbable component of the feed, means intermediate said feed introducing means and the said means for introducing the elutant and displaced from the means for introducing the feed in the direction of travel of the adsorbent for removing more readily adsorbable components of the mix, and means for returning some of the less readily adsorbed component to the adsorbent intermediate the point of removal of the less readily adsorbed component and the point where the elutant is introduced.

10. Apparatus as defined in claim 16 wherein there is means for returning some of the more readily adsorbable component to the adsorbent at a point between the feed means and the means for withdrawing the said more readily adsorbed component.

11. Apparatus for maintaining the counterflow of liquids and solids through a common cyclic path comprising a turntable having a peripheral series of cells each with a drain outlet, each cell containing a body of adsorbent material, means for maintaining a substantially constant depth of liquid in each cell of the turntable, means for rotating the turntable, an annular trough under the turntable having a corresponding number of cells into which the cells of the turntable drain as the turntable revolves, and means for withdrawing liquid from each cell of the trough and delivering it to a spray nozzle, which spray nozzle is located above the path of travel of the cells of the turntable and is displaced from the cell from which it receives fluid an angular distance such that the spray discharges over the cell next preceding the one from which it receives fluid, the displacement being in a direction away from the direction in which the turntable revolves.

12. In the process of separating a feed liquid into two fractions by selective adsorption, the steps which comprise moving a particulate adsorbent continuously through a closed cycle having at least three zones with the adsorbent moving reversely first through the third zone, then through the second zone, and finally through the first zone, introducing a feed mix into the adsorbent between the first and fourth zones and moving said feed mix to a point of outlet between the first and second zones and adsorbing from the feed mix the more readily adsorbed component in said first zone, the less readily adsorbed component being withdrawn at said outlet, introducing an elutant into the adsorbent between the second and third zones and circulating it counter to the movement of the adsorptive to desorb the more readily adsorbed component of the mix and withdrawing the more readily adsorbed component between the first and third zones, and refluxing some of the less readily adsorbed component into the adsorbent in the second zone to desorb elutant with which the adsorbent has become loaded in the third zone.

13. The process of separating a feed liquid into two fractions by selective adsorption which comprises continuously moving a particulate adsorbent through a closed cycle divided into at least four zones, the adsorbent moving through the zones in reverse order from the fourth toward the first, circulating a feed liquid through the adsorbent counter to the direction of the travel of the adsorbent from the beginning of the first zone toward the end of the first zone and adsorbing from the feed liquid in said zone the more readily adsorbable fraction thereof and withdrawing the less readily adsorbable fraction of the feed mix between the first and second zones, returning some of the less adsorbable fraction to the adsorbent at the beginning of the second zone and circulating it toward the third zone whereby it may be adsorbed into the adsorbent and desorb any elutant with which the adsorbent may be loaded, introducing an elutant into the adsorbent between the second and third zones and forcing it to flow through the third zone toward the fourth zone whereby it is adsorbed into the adsorbent and desorbs the more readily adsorbable fraction of the feed mix carried by the adsorbent removing the last-mentioned fraction between the third and fourth zones, and forcing a part of said last-mentioned fraction into the adsorbent material toward the beginning of the first zone for desorbing the less readily adsorbed fraction and forcing it toward the point of feed.

References Cited in the file of this patent

UNITED STATES PATENTS 2,646,451    Rommel _____ July 21, 1953

OTHER REFERENCES

Karnofsky: Let's Look at Selective Adsorption, Chem. Eng., September 1954, vol. 61, #9, pages 189–192.

UNITED STATES PATENT OFFICE
CERTIFICATION OF CORRECTION

Patent No. 2,967,148            January 3, 1961

George B. Karnofsky

It is hereby certified that error appears in the above numbered patent requiring correction and that the said Letters Patent should read as corrected below.

Column 8, line 62, for the claim reference numeral "7" read -- 3 --.

Signed and sealed this 6th day of June 1961.

(SEAL)
Attest:

ERNEST W. SWIDER
Attesting Officer

DAVID L. LADD
Commissioner of Patents